United States Patent [19]

van den Berg et al.

[11] 3,874,018

[45] Apr. 1, 1975

[54] WINDSHIELD WIPER CONSTRUCTION

[75] Inventors: Johan H. van den Berg, Hasselt;
Albert J. G. Hoebrechts, Mechelen Bovelingen; Alex. H. A. M. van Eekelen, Hasselt, all of Belgium

[73] Assignee: Monroe Belgium N.V., Sint-Truiden, Belgium

[22] Filed: June 25, 1973

[21] Appl. No.: 373,411

Related U.S. Application Data

[63] Continuation-in-part of Ser. No. 250,340, May 4, 1972, Pat. No. 3,837,033.

[52] U.S. Cl. ............................................ 15/250.32
[51] Int. Cl. ............................................... B60s 1/40
[58] Field of Search....... 15/250.31, 250.32, 250.34, 15/250.35, 250.42

[56] References Cited
UNITED STATES PATENTS

| | | | |
|---|---|---|---|
| 2,956,299 | 10/1960 | Ziegler | 15/250.32 |
| 3,082,463 | 3/1963 | Bock et al. | 15/250.32 |
| 3,405,419 | 10/1968 | Charlton | 15/250.32 |

FOREIGN PATENTS OR APPLICATIONS

| | | | |
|---|---|---|---|
| 1,576,797 | 6/1969 | France | 15/250.32 |
| 1,047,040 | 12/1958 | Germany | 15/250.32 |
| 748,933 | 5/1956 | United Kingdom | 15/250.32 |

Primary Examiner—Peter Feldman
Attorney, Agent, or Firm—Harness, Dickey & Pierce

[57] ABSTRACT

A universal connecting element adapted to detachably secure a variety of different types and sizes of windshield wiper blades to associated wiper arms, the connecting element being of a molded, one-piece construction fabricated of a corrosion resistant polymeric material and including an arm end receiving recess and first and second pivotable retaining members for detachably retaining the outer end of a wiper arm within the recess.

34 Claims, 20 Drawing Figures

WINDSHIELD WIPER CONSTRUCTION

This is a continuation-in-part application of copending Ser. No. 250,340, filed May 4, 1972, now U.S. Pat. No. 3,837,033, and is assigned to the assignee thereof.

SUMMARY OF THE INVENTION

The present invention is directed toward a new and improved connecting element for operatively securing a windshield wiper arm to an associated subassembly consisting of a wiper blade and associated support superstructure. The connecting element of the present invention will be found to have a number of features not shown in the prior art due to the fact that said element is of a one-piece molded plastic construction, preferably fabricated of nylon. As a result of this construction, only a single component part is required instead of a large number of separate components as has been necessary in heretofore known and used similar types of connectors. In addition, by virtue of the fact that the connecting element is fabricated of a polymeric or plastic material, there is no metal to metal contact and thus the connecting element of the present invention exhibits superior noise reducing characteristics. Also, no non-metallic spacer elements are necessary to avoid noise, as has been necessary in prior art connecting elements. Furthermore, by fabricating the connecting element of the present invention of a corrosion-resistant material, no special coating, i.e. painting or the like, is required in order to avoid corrosion of the different metallic parts having different positions on the electromotive scale, as has been necessary in the prior art. Of course, no coloring operations are necessary since pigmentation can be incorporated in the material from which the connecting element is fabricated.

A particular feature of the second embodiment of the connector element of the present invention resides in the fact that the element is adapted to be used in operatively connecting windshield wiper arms having different end configurations to associated wiper blade assemblies. In particular, the connector element is adapted to be operatively associated, not only with wiper arms having the conventional outwardly projecting cylindrical boss or shoulder formed thereon, but also with wiper arms of the type which are formed with laterally inwardly projecting notches. Additionally, the present invention may be used with both types of the aforesaid wiper arms which are of different cross-sectional sizes or widths, namely wiper arms which are approximately ⅜ inch in transverse dimension, and wiper arms which are approximately nine mm. in transverse section. Accordingly, the present invention will find wide and varied application.

Accordingly, it is a general object of the present invention to provide a new and improved connecting element for operatively connecting windshield wiper blades and associated superstructure to a wiper arm.

It is a more particular object of the present invention to provide a new and improved connecting element of the above character which is of a one-piece molded plastic construction and is thereby adapted to minimize inventory and related manufacturing expenses to the extreme.

It is another object of the present invention to provide a new and improved windshield wiper connecting element, as above described, which exhibits superior corrosion resistance and noise reducing characteristics.

It is a further object of the present invention to provide a new and improved windshield wiper connecting element that is of a simple design, and which will have a long and effective operational life.

It is still another object of the present invention to provide a new and improved windshield wiper connecting element which may be operatively associated with windshield wiper arms having cylindrical bosses or shoulders formed thereon, and also with windshield wiper arms having laterally inwardly extending notches formed thereon.

It is still another object of the present invention to provide a new and improved windshield wiper connecting element, as above described, which is adapted to be operatively associated with windshield wiper arms of different cross-sectional sizes and lengths.

Other objects and advantages of the present invention will become apparent from the following detailed description taken in conjunction with the accompanying drawing.

DESCRIPTION OF THE PREFERRED EMBODIMENT

Figure 1:
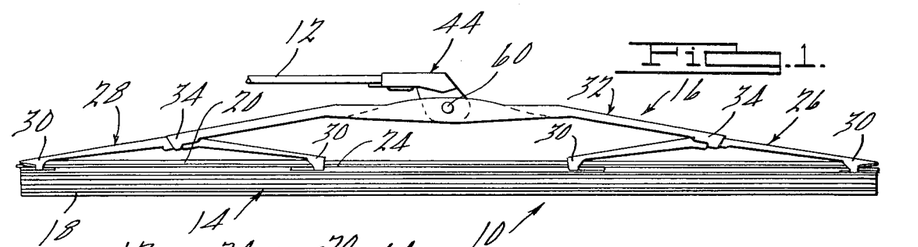
FIG. 1 is a side elevational view of the connecting element of the present invention, as shown in operative association of a conventional windshield wiper blade, superstructure and wiper arm.
Figure 2:
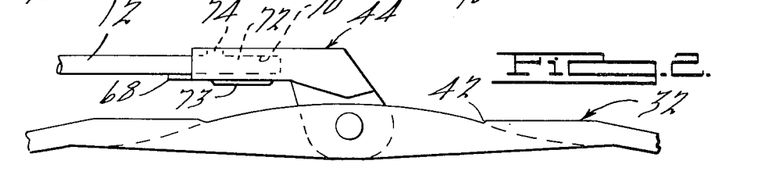
FIG. 2 is an enlarged side elevational view of the connecting element shown in FIG. 1.
Figure 3:
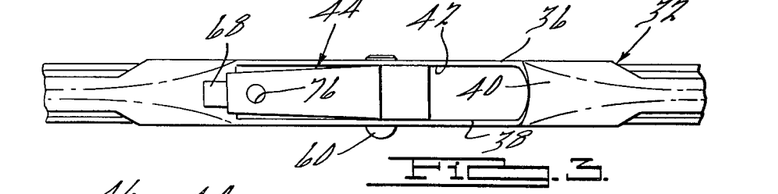
FIG. 3 is an enlarged top elevational view of the connecting element shown in FIG. 2.

Referring now in detail to the drawing and in particular to FIGS. 1 through 3 thereof, a windshield wiper blade assembly 10 is shown in general operative association with a wiper arm 12 which is intended to function in reciprocating the wiper blade assembly 10 across a surface, such as a vehicle windshield (not shown) to be cleaned. The assembly 10 generally comprises a wiper element 14 that is preferably constructed of some desirable resilient material, such as rubber or the like, and which is adapted to be supported by a wiper blade superstructure 16 upon the outer extremity of the arm 12. The wiper element 14 typically comprises a wiping lip portion 18 and a coextensive head portion 20 which are adapted to be supported by a longitudinally extending backing strip or flexor element 24.

The superstructure 16 is shown as comprising a pair of elongated yokes or links 26 and 28 that are substantially identical in construction and operation and which comprise generally U-shaped or claw-like end sections 30 adapted for clamping engagement with the aforementioned flexor element 24 in a manner well known in the art. Extending between and operatively connecting the yokes 26 and 28 in an elongated bridge member 32 having opposite end portions 34 connected to the upper extremities of the yokes 26 and 28. As best shown in FIG. 3, the bridge member 32 is of a generally channel-shaped configuration and comprises opposed side portions 36 and 38 and an interconnecting top or web portion 40. The top portion 40 of the bridge member 32 is formed with a central opening 42 which is adapted to operatively receive a connecting element 44 that is constructed in accordance with the principles of the present invention and is operable to support the subassembly consisting of the superstructure 16 and assembly 10 on the outer or terminal end of the arm 12, as will hereinafter be described in detail.

Figure 4:
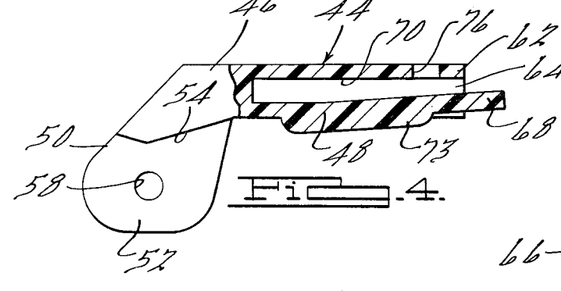
FIG. 4 is an enlarged side elevational view of the connecting element of the present invention.
Figure 5:
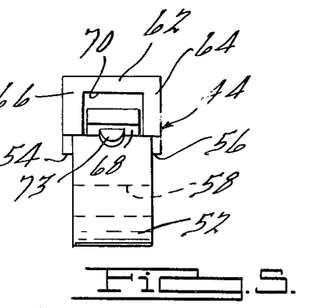
FIG. 5 is an end elevational view of the right end of the connecting element illustrated in FIG. 4.
Figure 6:
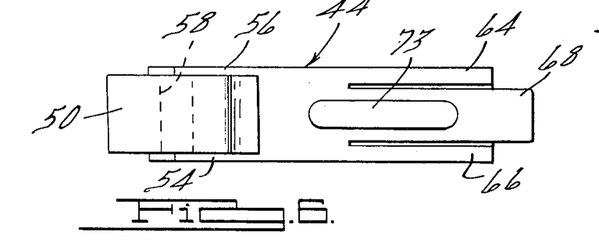
FIG. 6 is a bottom elevational view of the connecting element illustrated in FIG. 4.

As best shown in FIGS. 4 through 6, the connecting element 44 of the present invention is of a molded one-piece construction and comprises a body 46 which is made up of an arm attachment section 48 and a blade attachment section 50. The blade attachment section 50 is formed with a reduced thickness portion 52 which defines a pair of laterally extending shoulders 54 and 56. The lateral width of the portion 52 is designed to correspond with the interior spacing between the side portions 36 and 38 of the bridge member 32, whereby the connecting element 44 is adapted to be nestingly received therebetween, as shown in FIGS. 1 through 3. The section 50 is formed with a laterally extending opening 58 which is adapted for registry with a pair of aligned openings in the side portion 36, 38 of the bridge member 32, which openings are adapted to receive a suitable pivot pin, rivet or the like 60 for pivotably connecting the connecting element 44 to the superstructure 16, and in particular, the bridge member 32 thereof. As illustrated, when the connecting element 44 is thus connected to the bridge member 32, the blade assembly 10 is pivotable about an axis extending at generally right angles to the arm 12, as will be appreciated by those skilled in the art.

With reference now to the arm attachment section 48 of the connecting element 44, said section 48, as previously mentioned, is formed integrally of the attachment section 50 and comprises a longitudinally extending top portion 62 and a pair of downwardly extending laterally spaced side portions 64 and 66, as best seen in FIG. 5. Extending longitudinally outwardly from the body 46 at the position interjacent the side portions 64, 66 is a resilient spring finger section 68 which defines with the portions 62 through 66, a generally rectangular shaped, longitudinally extending recess 70 that is adapted to nestingly receive the terminal end 72 of the wiper arm 12 in a manner best shown in FIG. 4. The spring finger section 68 is formed with a reinforcing rib or the like 73 on the lower side thereof and is adapted to deform or pivot about an axis extending generally perpendicular to the recess 70, whereby to resiliently bias the terminal end 72 of the arm 12 upwardly toward the underside of the top portion 62. In this configuration, a generally cylindrically shaped lug 74, that is conventionally provided on the terminal ends of windshield wiper arms, is biased upwardly into nesting engagement with an annular opening 76 formed within the top portion 62, whereby to fixedly secure the connecting element 44 against relative longitudinal displacement with respect to the arm 12.

While the connecting element 44 of the present invention may be fabricated of a wide variety of different types of materials, the element 44 is preferably fabricated of a corrosion resistant plastic material which is of a high structural integrity. One material that has been found to be highly satisfactory is Nylon 6 which consists of a Nylon obtained by polycondensation of caprolactam. This particular material has the following general physical characteristics: a tensile strength of between 73,000 and 120,000 lbs./sq. inch; elongation 16 to 42 percent; specific gravity 1.14; and a moisture absorbency of 8 percent at 95 percent humidity. It will be appreciated, of course, that various other materials having similar physical characteristics may be used in fabrication of a connecting element 44 without departing from the scope of the present invention. In accordance with a preferred construction of the present invention, the material from which the connecting element 44 is fabricated is reinforced with a glass fibrous material or an equivalent strengthening substance. While such strengthening material is not absolutely necessary to achieve proper operation of the element 44, the provision of such ancillary material has been found highly desirable in enhancing the structural integrity thereof. Preferably a composition of approximately 70 percent Nylon to approximately 30 percent glass fiber has been found to be highly satisfactory.

One particularly important feature of the present invention resides in the fact that the connecting element 44 is of a one-piece molded construction, and thus overcomes a number of particularly objectionable manufacturing characteristics of similar type elements heretofore known and used in the prior art which consisted of multi-components that were fabricated, for example, of various metallic materials. The construction of this invention readily lends itself to injection molding techniques, thus obviating the need for any complicated stamping and assembly operations which have been required with metal connectors. Another feature of the present invention results in the fact that there is no metal-to-metal contact between various components thereof, thus enhancing the noise characteristics of the connecting element 44. In addition, no plastic or similar non-metallic spacer elements are required for separating metal components, as has heretofore been required. Additionally, by fabricating the connecting element 44 of a one-piece molded plastic construction, the corrosion resistance characteristics of the element are inordinately superior to conventional metal connecting elements, with such superior corrosion resistance existing without the need for any painting or other coating operations. Of course, when it is desired to color the connecting element of the present invention, the coloring pigment may be placed directly within the material from which the connecting element 44 is fabricated so as to provide certain aesthetic advantages over conventional metal connectors. Still a further advantage of the present invention over prior known connecting elements results in the minimizing of the light reflection characteristics which may be achieved with molded plastics, as compared with the highly reflective character of conventional metal connectors, whereby to assure against possible distracting glare under certain light conditions.

It will be noted that the spring finger section 68 slopes upwardly toward the outer end of the recess 70 so that at such time as the terminal end 72 of the associated wiper arm 12 is inserted into the recess 70, the finger section 68 is biased slightly downwardly relative to the top portion 62, with such biasing of the spring finger section 68 causing the same to be stressed, which in turn results in the section 68 exerting a continuously upwardly directed force against the underside of the end 72 of the arm 12 to insure positive engagement of the lug 74 within the opening 76. It will be appreciated, of course, that at such time as it is desired to detach the assembly 10 from the arm 12, it is merely necessary to bias the finger section 68 slightly downwardly to permit the end 72 to be moved away from the top portion 62 and thus effect withdrawal of the lug 74 from the opening 76, at which time the entire assembly 10 may be longitudinally displaced away from the end of the wiper arm 12 for purposes of replacement, inspection, etc.

Figure 7:
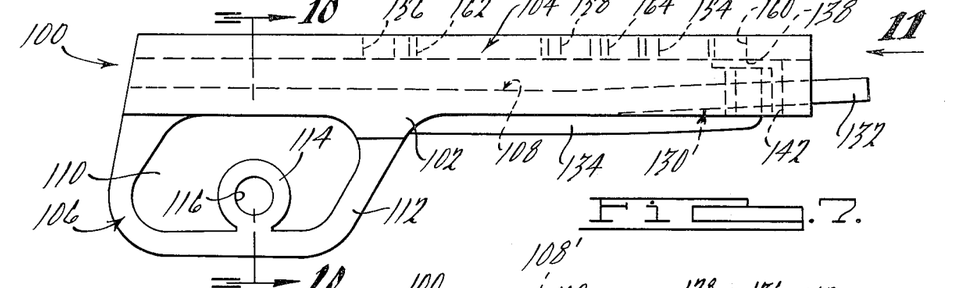
FIG. 7 is a side elevational view of alternate embodiment of the connecting element of the present invention.

Referring now to FIGS. 7-20, a connecting element 100, in accordance with a modified embodiment of the present invention, is shown as being fabricated of one-piece molded construction in the same manner as the aforedescribed connecting element 44. Generally speaking, the connecting element 100 includes a one-piece body 102 consisting of an attachment section 104 and a mounting section 106. The mounting section 106 of the connecting element 100 is adapted to be secured to a windshield wiper blade assembly, such as the blade assembly 10, in much the same manner as the connecting element 44, whereby to operatively secure the blade assembly to an associated wiper arm. The attachment section 104 is formed with an elongated, generally rectangular shaped channel shaped recess, generally designated by the numeral 108, which, as best seen in FIGS. 7 and 11, extends the entire length through the connecting element 100. As will hereinafter be described, the channel 108 is adapted to removably receive selected windshield wiper arm ends in a manner such that the connecting element 100 is detachably secured thereto.

Figure 9:
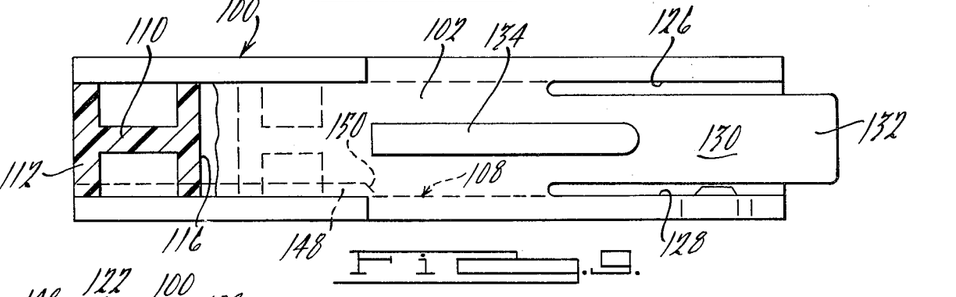
FIG. 9 is a bottom elevational view of the connecting element shown in FIGS. 7 and 8.
Figures 10, 11:
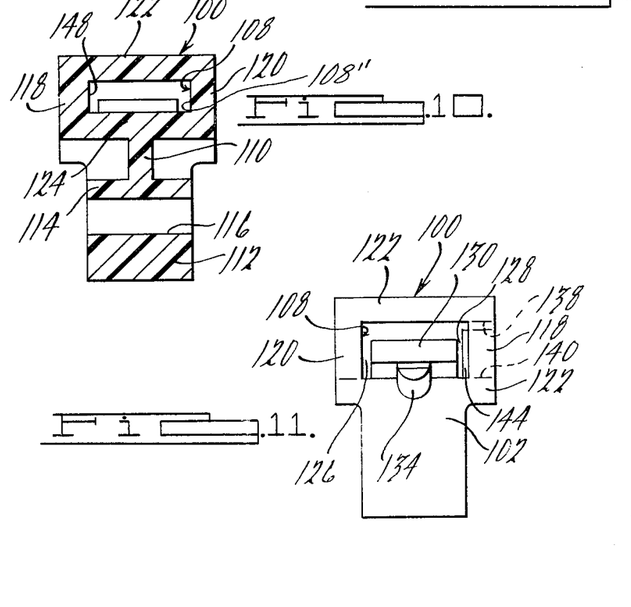
FIG. 10 is a transverse cross-sectional view taken substantially along the line 10—10 of FIG. 7.
FIG. 11 is an end elevational view taken in the direction of the arrow 11 of FIG. 7.

As shown in FIGS. 7 and 9, the mounting section 106 of the connecting element 100 is formed with a reduced thickness web portion 110 around which a laterally thickened peripheral portion 112 is formed. In addition, an annular thickened portion 114 is formed centrally of the web portion 110 and defines a central aperture 116 which is analogous to the aforedescribed aperture 58 in the connecting element 44 and is adapted to receive a suitable pin, rivet or the like for securing the connecting element 100 to an associated bridge member of a windshield wiper assembly that is to be secured to a selected windshield wiper arm end.

As best seen in FIG. 10, the attachment section 104 of the connecting element 100 is of a generally rectangular shaped transverse cross section and comprises a pair of laterally spaced generally vertically disposed parallel side portions 118 and 120, which are connected by integral top and bottom or upper and lower portions 122 and 124, respectively, the portions 118-124 defining the elongated arm end receiving channel 108 therebetween. As best seen in FIG. 9, the bottom portion 124 of the connecting element is formed with a pair of spaced apart generally coextensive elongated slots 126 and 128 which define an integral retaining finger 130 therebetween, the retaining finger 130 being analogous to the aforedescribed spring finger 68 and is adapted to function in essentially the same manner in operatively securing a windshield wiper arm end within the channel 108, as will hereinafter be described. The finger 130 includes an outer end portion 132 which projects beyond the outer end of the body 102 of the connecting element 100 and, along with the rest of the finger 130, is inclined generally upwardly into the channel 108. Formed directly below the finger 130 is integral reinforcing rib 134 which is analogous to the aforedescribed rib 73. The spring finger 130 is adapted to deform or pivot about an axis extending generally perpendicular to the channel 108, whereby to resiliently bias the terminal end of the windshield wiper arm end received within the channel 108 into positive engagement with the arm retaining means formed on the element 100 and hereinafter to be described.

Figure 8:
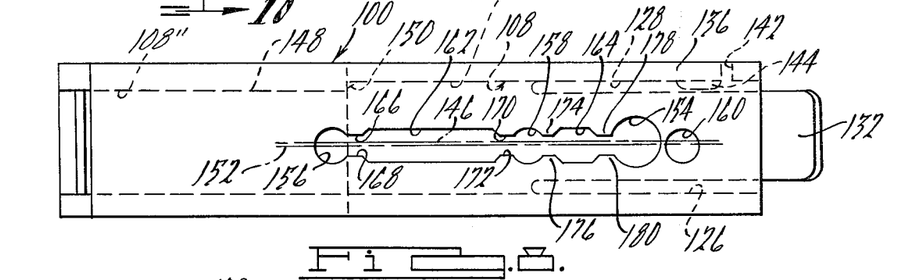
FIG. 8 is a top elevational view of the connecting element shown in FIG. 7.

With reference to FIGS. 8 and 11, it will be seen that the side portion 118 of the element 100 is formed with a pair of elongated, generally vertically spaced, longitudinally extending slots 138 and 140 which, together with a generally vertically extending slot 142 that extends between the adjacent ends of the slots 138, 140, define another pivotable retaining or spring finger, herein designated by the numeral 136. The finger 136 will be seen to be located at generally right angles with respect to the finger 130 and is pivotable by generally vertical axis in the drawings, i.e., about an axis arranged at generally right angles to the axis about which the finger 130 is pivotable. The outer or cantilevered end of the finger 136 is formed with an inwardly extending projection 144 which is adapted to cooperate with certain types of wiper arm ends inserted into the channel 108 to operatively retain the same therein, as will hereinafter be described. It will be appreciated, of course, that a preloading may be applied to the spring finger 136 in much the same manner as preloading is provided on the finger 130; i.e., by initially forming the finger 136 in a manner such that the outer end thereof is inclined inwardly into the channel 108.

The channel 108 is shown as being generally rectangular in cross section and the end thereof located at the right side of FIGS. 7–9 is of a transverse dimension of a predetermined magnitude and thereby adapted to receive wiper arm ends having approximately the same transverse dimension. Preferably, although not necessarily, the transverse width of the right end of the channel 108, hereinafter identified by the numeral 108', is in the order of ⅝ inch, and the center line of the channel portion 108' is shown in FIG. 8 and designated by the numeral 146. The left end of the channel 108 shown in FIGS. 7–9 is formed with an inwardly projecting section 148 having an inclined stop shoulder 150 at the end thereof confronting the right end of the channel 108, i.e., the channel portion 108'. As a result of the inwardly projecting section 148, the left end of the channel 108, hereinafter identified by the numeral 108", is predeterminately smaller than the channel portion 108' and is adapted to receive arm end portion of a corresponding predeterminately smaller, transverse dimension; preferably, although not necessarily, the transverse dimension of the channel portion 108" is approximately 9 mm. The center line of the channel portion 108" is shown in FIG. 8 and is designated by the numeral 152 and is depicted as being laterally offset from the aforementioned line 146 due to the reduced transverse size of the channel portion 108".

In accordance with the principles of the present invention, the top portion 122 of the connecting element 100 is formed with an aperture 154 which is analogous to the aperture 76 formed in the aforedescribed element 44. As shown in FIG. 8, the aperture 154 is located on the center line 146, and is thus centrally located with respect to the channel portion 108'. In addition, the top section 122 is formed with three longitudinally spaced apertures 156, 158 and 160, all of which are located on the center line 152 of the channel portion 108". As viewed in FIG. 8, the apertures 156 and 158 are located on the left side of the aperture 154, while the aperture 160 is located on the right side thereof. Also, the top section 122 is formed with a pair of longitudinally extending slots which, like the apertures 156–160, are located on the center line 152 of the channel portion 108". The slot 162 extends longitudinally between the apertures 156 and 158, while the slot 166 extends longitudinally between the aperture 158 and the aperture 154. A pair of laterally inwardly projecting shoulders 166, 168 are located at the juncture of the slot 162 and aperture 156, and a similar pair of inwardly projecting shoulders 170, 172 are formed at the intersection or juncture of the slot 162 and aperture 168. Additionally, inwardly projecting shoulders 174, 176 and 178, 180 are located at the opposite ends of the slot 164 where the same intersects the apertures 158 and 154, respectively.

Generally speaking, the connecting element 100 depicted in FIGS. 7–20 is adapted to be operatively associated with two different types of windshield wiper arm ends. In particular, the connecting element 100 is adapted to be operatively associated with windshield wiper arm ends of the type shown in FIG. 12 and identified by the numeral 182. This type of windshield wiper arm is also shown in operative association with the connecting element 44 and comprises a centrally located outwardly projecting cylindrical boss portion 184. In addition to the windshield wiper arm 92, the connecting element 100 is adapted to be operatively associated with windshield wiper arm ends of the type shown in FIG. 13 and identified by the numeral 186. This latter type of wiper arm is formed with a pair of generally longitudinally aligned laterally inwardly projecting rectangular shaped notches or notched portions 188 and 190 which are cooperable with the spring finger 136 in a manner hereinafter to be described. It is conventional in the industry to manufacture wiper arm ends of the type shown in FIG. 12 in both ⅝ inch and nine millimeter transverse widths, while wiper arm ends of the type shown in FIG. 13 are conventionally provided in only a ⅝ inch transverse width. Accordingly, the aforedescribed dimensions of the channel portions 108' and 108" have been selected to correspond with these dimensions. Of course, it will be appreciated that the present invention is in no way limited to these specific dimensions, since the size of the channel 108 may be adapted to a wide variety of different size wiper arm ends.

Figure 12:
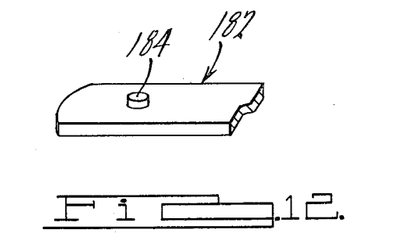
FIG. 12 is an elevated fragmentary perspective view of the end portion of a typical windshield wiper arm with which the present invention is intended to be operatively associated.
Figure 13:
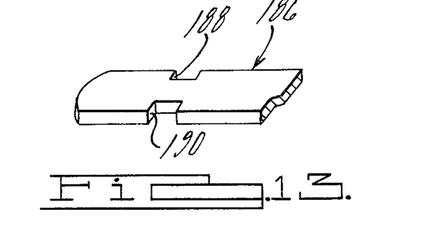
FIG. 13 is a view similar to FIG. 12 and illustrates another type of windshield wiper arm with which the present invention may be operatively associated.
Figure 14:
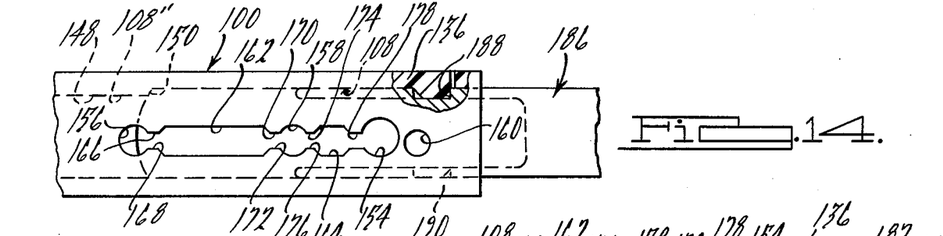
FIG. 14 is an enlarged fragmentary top elevational view of a portion of the connector element shown in FIG. 7, partially broken away, as seen in operative association with a windshield wiper arm of the type shown in FIG. 13.
Figure 15:
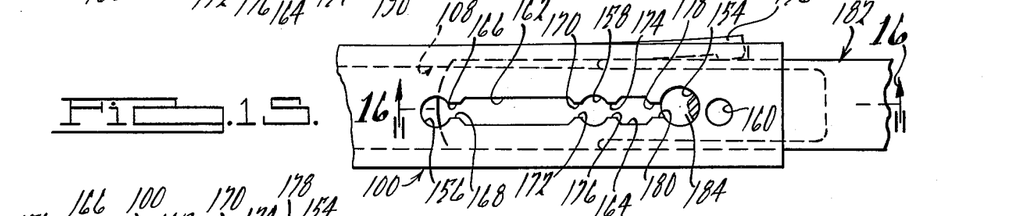
FIG. 15 is a view similar to FIG. 14 and shows the connector element of the present invention in operative association with a windshield wiper arm of the type shown in FIG. 12.
Figure 16:
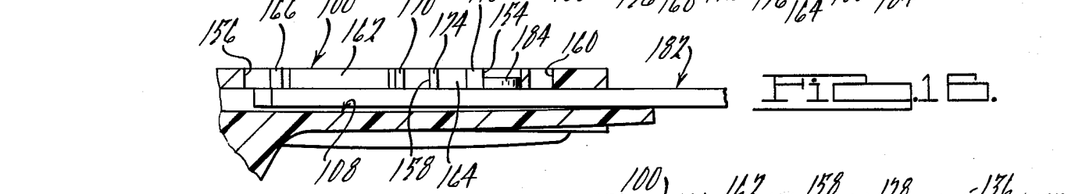
FIG. 16 is an enlarged fragmentary cross-sectional view taken substantially along the line 16—16 of FIG. 15.

Assuming that a wiper arm end, such as that designated by the numeral 182 in FIG. 12, which is of a ⅝ inch transverse dimension, is to be secured to the connecting element 100, the same is inserted longitudinally into the channel 108 in the manner shown in FIGS. 15 and 16. The wiper arm end 182 is inserted until the terminal end thereof engages the stop shoulder 150 defined by the projection 148, which results in the boss portion 184 being longitudinally aligned with the aperture 154, whereupon the spring finger 130 may function to bias the arm end 182 upwardly so that the boss portion 184 thereof is positively engaged within the aperture 154 in essentially the same manner as described in connection with the connecting element 44. In the event the connecting element 100 is adapted to be operatively associated with a ⅝ inch wide wiper arm end of the type shown in FIG. 13 and designated by the numeral 186, the same is inserted longitudinally into the channel portion 108 to a position wherein the terminal end thereof engages the stop shoulder 150. In this position, one of the notched portions 188, 190 is longitudinally aligned with the projection 144 on the finger 146 and due to the preload or spring bias of the finger 136, the projection 144 thereon will move into nesting engagement with the associated of the notch portions 188 or 190 to positively retain the wiper arm end 186 within the channel 108.

Figure 17:
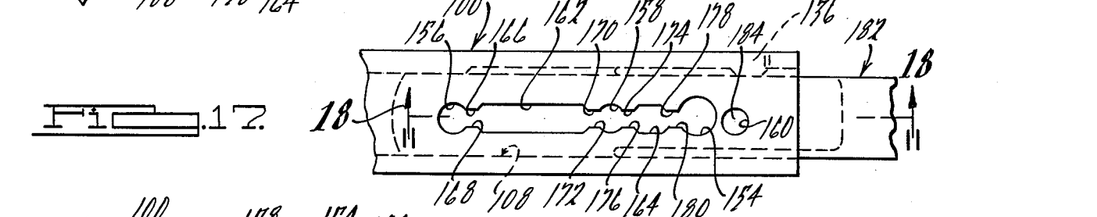
FIGS. 17 and 19 are views similar to FIG. 13 and show the connecting element of the present invention in operative association with the windshield wiper arms of the type shown in FIG. 12.
Figure 18:
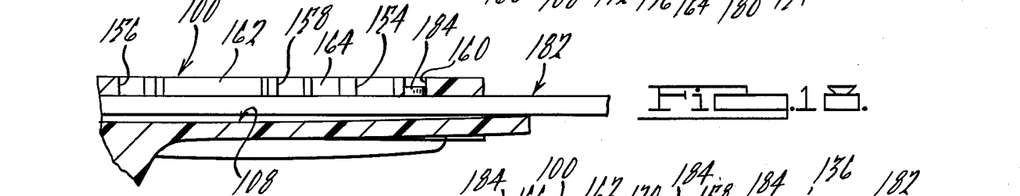
FIGS. 18 and 20 are fragmentary cross-sectional views taken substantially along the lines 18 and 20 of FIGS. 17 and 19, respectively.
Figures 19, 20:
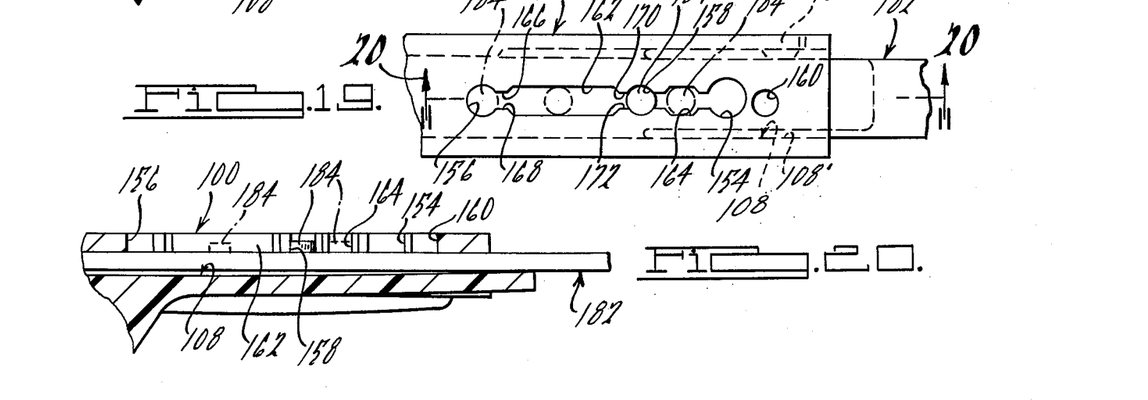

Assuming that the transverse width of the arm end 182 is nine millimeters, the arm end 182 is adapted to be inserted into the channel 108 and extend through the channel portion 108' into the channel portion 108", as shown in FIGS. 17–20. The dimension of the boss portion 184 on windshield wiper arm ends of 9 millimeter width are typically 2.9 millimeters and the plurality of apertures 156, 158 and 160 are therefore approximately 2.9 millimeters in diameter. In addition, the longitudinal slots 162 and 164 are also of approximately 2.9 millimeters in width, whereby when the 9 millimeter wide windshield wiper arm ends are inserted into the channel 108, the boss portions 184 thereon may be received directly within one of the apertures 156–160 or may be inserted into one of the slots 162, 164 and may be moved longitudinally therein before being inserted into one of the adjacent apertures. It is contemplated that the aperture 158 would normally be used for receiving the 2.9 millimeter diameter boss portions of 9 millimeter wide windshield wiper ends 182; however, due to the fact that the longitudinal length of the spring finger 130 is relatively small, it is contemplated that some difficulty may be involved in engaging the boss portion 184 directly into the aperture 158. In order to overcome any such difficulty, the windshield wiper arm 182 may be inserted into the channel portion 108' and the boss portion 184 inserted into the slot 164. Thereafter, the arm 182 is biased longitudinally within the channel 108 until the boss portion 184 moves between the shoulders 174, 176 and is nestingly received within the aperture 158. It will be appreciated, of course, that for various applications, the boss portion 184 may be operatively received within the aperture 160, as shown in FIGS. 17 and 18, or within the extreme left hand aperture 156, as shown in dotted lines in FIGS. 19 and 20. In the event the boss portion is to be received within the aperture 156, the same may be initially positioned within the elongated slot 162 and the wiper arm 182 may be biased longitudinally until the boss portion moves between the shoulders 166, 168 into the aperture 156. It will be noted that side play of the 9 millimeter or reduced width wiper arm ends is prevented due to the inwardly disposed projection 148. In addition, however, the projection 144 of the finger 136 serves to minimize such side play in that the spring bias or preload of the finger 136 acts perpendicular to the arm end inserted into the channel 108. It will be noted that by providing a plurality of longitudinally spaced apertures 156, 158 and 160 into which the boss portion 184 of 9 millimeter wide arm ends 182 may be inserted, the wiper blade may be asymmetrically mounted such that a predeterminate amount of the wiper blade may be located outboard of the interconnection between the blade in the associated wiper arm, whereby to accommodate for certain types of wiper installations.

While it will be apparent that the preferred embodiments illustrated herein are well calculated to fulfill the objects above stated, it will be appreciated that the present invention is susceptible to modification, variation and change without departing from the scope of the invention.

What is claimed is:

1. A connecting element adapted to detachably secure a windshield wiper blade assembly on windshield wiper arms of the type having outwardly projecting boss portions and/or inwardly projecting recessed areas, said connecting element comprising means defining an elongated channel adapted to removably receive wiper arm ends therewithin, said channel having a first portion of a first predetermined width into which wiper arm ends of approximately said first predetermined width are insertable, and a second portion of a second predetermined width into which wiper arm ends of approximately said second predetermined width are insertable, at least one boss receiving means associated with each of said portions of said channel cooperable with the bosses of wiper arm ends inserted into said recess portions, and first and second movable retaining fingers formed integrally of said element, one of said fingers adapted for engagement with said recessed areas of certain types of said wiper arm ends, and the other of said retaining fingers being cooperable with wiper arm ends having boss portions thereon for causing positive engagement of said boss portions with selected of said boss receiving means.

2. The invention as set forth in claim 1 wherein said first and second retaining fingers are arranged at generally right angles.

3. The invention as set forth in claim 1 wherein said boss receiving means comprises at least one aperture formed in said first and second portions of said channel and adapted to receive boss portions of wiper arm ends inserted into said channel.

4. The invention as set forth in claim 1 wherein said connecting element is fabricated of a one-piece polymeric material.

5. The invention as set forth in claim 3 which includes longitudinally extending slots interconnecting certain of said apertures.

6. The invention as set forth in claim 1 wherein said second channel portion is of a smaller transverse dimension than said first channel portion, and wherein said first and second channel portions have laterally offset center lines.

7. The invention as set forth in claim 6 which includes one aperture formed on said center line of said first channel portion and a plurality of apertures formed on said center line of said second channel portion.

8. The invention as set forth in claim 7 which includes at least one longitudinally extending slot lying along the center line of said second channel portion and interconnecting certain of said apertures aligned therewith.

9. The invention as set forth in claim 8 which includes inwardly projecting shoulder portions formed at the juncture of said slots and said apertures.

10. The invention as set forth in claim 6 which includes a projection extending into said channel and partially defining said second channel portion.

11. The invention as set forth in claim 10 wherein said projection defines a stop shoulder.

12. The invention as set forth in claim 10 wherein said second retaining finger is cooperable with said projection in preventing side play of a wiper arm end inserted into said channel.

13. The invention as set forth in claim 6 wherein the transverse dimension of said first channel portion is approximately ⅜ inch and the transverse dimension of said second channel portion is approximately 9 millimeters.

14. A connecting element adapted to detachably secure a windshield wiper on one end of an associated wiper arm, said connecting element comprising means defining a recessed area adapted to removably receive said arm end therewithin, and means including first and second pivotable retaining fingers arranged at generally right angles to one another and formed integrally of said element and adapted to cooperate with a wiper arm end disposed within said recessed area in a manner so as to detachably secure said element to said wiper arm.

15. The invention as set forth in claim 14 wherein said recessed area comprises an elongated channel having a first portion of a first predetermined width and a second portion of a second predetermined width, and which includes means associated with said first and second portions cooperable with wiper arm ends inserted thereinto for removably retaining the same within said channel.

16. The invention as set forth in claim 14 which includes first and second movable retaining fingers formed integrally of said element and adapted to cooperate with wiper arm ends disposed within an elongated channel in said element for removably securing the same therein.

17. The invention as set forth in claim 14 which includes an elongated wiper arm end receiving channel, and which includes means in the form of at least one aperture for receiving a boss portion formed on a wiper arm end inserted into said channel.

18. The invention as set forth in claim 17 wherein said second channel portion is of a smaller transverse dimension than said first channel portion, and wherein said first and second channel portions have laterally offset center lines.

19. The invention as set forth in claim 18 which includes one aperture formed on said center line of said first channel portion and a plurality of apertures formed on said center line of said second channel portion.

20. The invention as set forth in claim 19 which includes at least one longitudinally extending slot lying along the center line of said second channel portion and interconnecting certain of said apertures aligned therewith.

21. A connecting element adapted to detachably secure a subassembly consisting of a wiper blade and a blade supporting superstructure to the outer end of a wiper arm having a recessed area formed therein,
said connecting element being pivotably connected to the blade superstructure and being of a molded one-piece construction and fabricated of a corrosion resistant polymeric material and comprising an integral retaining finger adapted for engagement with said recessed area of said arm, whereby to detachably secure the same to said element, said finger being located on and extending along one side of said element, with said finger being pivotable about an axis arranged at generally right angles to the pivotal axis between said element and said blade superstructure.

22. The invention as set forth in claim 21 which includes first and second movement retaining fingers formed integrally of said element.

23. The invention as set forth in claim 22 which includes an elongated channel having a first portion of a first predetermined width and a second portion of a second predetermined width, and means including said first and second retaining fingers associated with said first and second portions cooperable with wiper arm ends inserted thereinto for removably retaining the same within said channel.

24. The invention as set forth in claim 21 which includes an elongated wiper arm end receiving channel, and which includes means in the form of at least one aperture for receiving a boss portion formed on a wiper arm end inserted into said channel.

25. The invention as set forth in claim 21 wherein said second channel portion is of a smaller transverse dimension than said first channel portion, and wherein said first and second channel portions have laterally offset center lines.

26. The invention as set forth in claim 25 which includes one aperture formed on said center line of said first channel portion and a plurality of apertures formed on said center line of said second channel portion.

27. The invention as set forth in claim 26 which includes at least one longitudinally extending slot lying along the center line of said second channel portion and interconnecting certain of said apertures aligned therewith.

28. A connecting element adapted to detachably secure a windshield wiper blade on one end of an associated wiper arm,
said connecting element having means defining a recessed area adapted to removably receive a wiper arm end,
said recessed area having a first portion of a first predetermined width into which a wiper arm end of approximately said first predetermined width is insertable, and a second portion of a second predetermined width different from said first predetermined width and into which a wiper arm end of approximately said second predetermined width is insertable, and
first and second movable retaining fingers formed integrally of said element and cooperable with wiper arm ends inserted into said recessed area for removably retaining the same within said recessed area.

29. The invention as set forth in claim 28 which includes first and second movable retaining fingers formed integrally of said element and adapted to cooperate with wiper arm ends disposed within an elongated channel in said element for removably securing the same therein.

30. The invention as set forth in claim 29 which includes an elongated wiper arm end receiving channel, and which includes means in the form of at least one aperture for receiving a boss portion formed on a wiper arm end inserted into said channel.

31. The invention as set forth in claim 30 wherein said connecting element is fabricated of a one-piece polymeric material.

32. The invention as set forth in claim 29 wherein said second channel portion is of a smaller transverse dimension than said first channel portion, and wherein said first and second channel portions have laterally offset center lines.

33. A connecting element adapted to detachably secure a windshield wiper blade assembly on windshield wiper arms of the type having outwardly projecting boss portions and/or inwardly projecting recessed areas,
said connecting element comprising means defining an elongated channel adapted to removably receive wiper arm ends therewithin,
said channel having a first portion of a first predetermined width into which wiper arm ends of approximately said first predetermined width are insertable, and a second portion of a second predetermined width into which wiper arm ends of approximately said second predetermined width are insertable, said second channel portion being of a different transverse dimension than said first channel portion, and said first and second channel portions having laterally offset center lines, and
at least one boss receiving aperture formed on said center line of said first channel portion and at least one boss receiving aperture formed on said center line of said second channel portion.

34. A connecting element adapted to detachably secure a windshield wiper blade on one end of an associated wiper arm,
   said connecting element having means defining a recessed area adapted to removably receive a wiper arm end,
   said recessed area having a first portion of a first predetermined width into which a wiper arm end of approximately said first predetermined width is insertable, and a second portion of a second predetermined width different from said first predetermined width and into which a wiper arm end of approximately said second predetermined width is insertable, said first and second portions of said recessed area being generally coextensive of one another having the center lines thereof arranged parallel to one another and spaced laterally apart.

* * * * *